(No Model.)
J. R. ROBINSON.
SAFETY SEAM FOR STEAM BOILERS.
No. 282,120. Patented July 31, 1883.
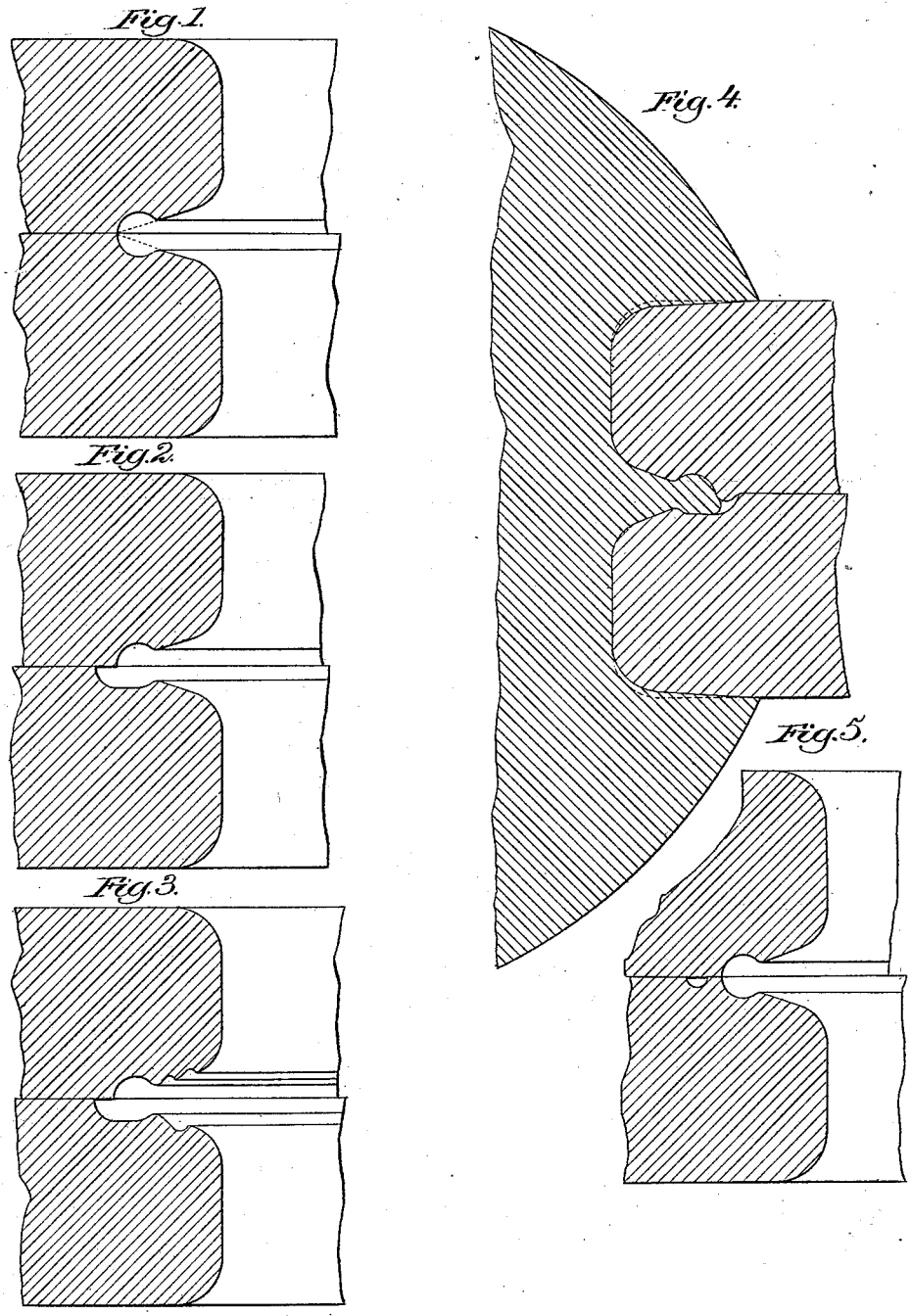

UNITED STATES PATENT OFFICE.

JAMES R. ROBINSON, OF CAMBRIDGE, MASSACHUSETTS.

SAFETY-SEAM FOR STEAM-BOILERS.

SPECIFICATION forming part of Letters Patent No. 282,120, dated July 31, 1883.

Application filed November 3, 1882. (No model.)

*To all whom it may concern:*

Be it known that I, JAMES R. ROBINSON, of Cambridge, county of Middlesex, State of Massachusetts, have invented an Improved Safety-Seam for Steam-Boilers, of which the following description, in connection with the accompanying drawings, is a specification, like letters on the drawings representing like parts.

In a patent granted to me August 10, 1880, for a mode of uniting metal plates by riveting, I described the formation of a space between the lapped faces of the plates around the rivet-holes by countersinking or beveling the surfaces of the plates. Into the wedge-shaped space thus formed the metal of the rivet is forced in heading. There is thus formed an enlargement of the rivet which enters the space between the plates formed by the beveling or countersinking. The action of this enlargement of the rivet, in opening the seams of a boiler under undue strain without rupturing it, is explained in that patent. I have been accustomed to call the seam produced by riveting plates in that way a "safety-seam." My present invention is an improvement on that seam, and gives it greater initial strength without destroying its capacity to yield and open without rupture under an undue strain. The strength of a riveted seam is dependent, among other things, upon the intimacy of contact between the lapped surfaces and the interlocking of their particles secured by the strain of the rivets and the pressure upon the surfaces of the plates caused by heading the rivets. It is important, therefore, that the plates shall be as free as possible to yield to this pressure exerted upon them in riveting. As the metal of the rivet is forced to enter the V or wedge-shaped space between the plates described in my former patent, it would obviously receive a portion of the pressure exerted on the outer surface of the plates, and would tend to prevent the lapped surfaces of the plates from coming into as intimate engagement as they might if this metal were not present, especially if the space were completely filled before the ultimate pressure was exerted upon the plates, or if the outer thin edge of the enlargement of the rivet should be so cooled by contact with the surfaces of the plates as to prevent or check any further flow of the metal. To prevent these contingencies from arising, as far as possible, and to make provision for the lateral expansion of the metal of the rivet, with as little resistance as may be from the surfaces of the plates or from the cooling of the metal of the rivet itself, I change the form of the space between the plates described in my former patent by enlarging it at the outer edge so as to form a chamber into which the metal of the rivet may continue to flow under the ultimate strain exerted in riveting. In the drawings hereto annexed I have represented the new form I propose to give to the space between the plates. It is formed by cutting around the outer portion of the wedge-shaped space a groove of sufficient capacity to receive all the metal which may be forced out by the linear compression of the rivet and its lateral expansion.

The several figures show a section of the lapping-plates on one side of a rivet-hole. Figure 4 shows, in addition, a section of a part of a rivet inserted in the plates, showing its extension into the space between the plates. The full lines in Fig. 1 show the form which I propose to give to the chamber. The dotted lines show the form the space would have if constructed according to my former patent. In Fig. 2 I have shown the groove formed in one of the plates larger or wider than that in the other, so that at the outer limits of the grooves the surface of one plate overlaps the surface of the other. This allows an interlocking of the plates under the pressure exerted on them in heading the rivets, and furnishes an increased resistance to the sliding of the plates upon each other. The way in which this interlocking arises is represented in Fig. 4. The metal of the rivet which spreads into the chamber also becomes interlocked with both plates, as shown in Fig. 4, and thus resists the sliding of the plates; and it may be made to interlock with the beveled or countersunk surfaces of the plates by cutting them with grooves, as shown in Fig. 3. The interlocking of the plates may also be secured by a groove or chamber in one of the plates, as shown in Fig. 5, which is not connected with the rivet-holes or their enlargement.

I may add also that the advantages of the chamber I have described for allowing the internal flow of the metal of the rivet are not limited to plates having the space of the form described in my former patent, but may be secured to a greater or lesser extent by forming a cavity between the surfaces opening into the rivet-holes by a passage of different form, and the form of the chamber may also be varied.

What I claim as my invention is—

1. The chamber herein described, formed between the lapping-surfaces of plates, and communicating with the rivet-holes to receive the metal of the rivet which may be forced outward by the compression of the rivet in heading.

2. The method herein described of causing the plates to interlock by making the plane surface of one plate extend over a groove cut in the other.

3. The grooving of the beveled surfaces of the plates around the rivet-holes by means of which the metal of the rivet may be interlocked with the beveled surfaces of the plates, substantially as shown.

In testimony whereof I have signed my name to this specification in the presence of two subscribing witnesses.

JAMES R. ROBINSON.

Witnesses:
 JOS. P. LIVERMORE,
 B. J. NOYES.